United States Patent

Hillier et al.

[11] 3,978,265
[45] Aug. 31, 1976

[54] GASKET MATERIAL

[75] Inventors: Edward Francis Herbert Benjamin Hillier; Robin Anthony Walker, both of Cheltenham, England

[73] Assignee: Dowty Seals Limited, Tewkesbury, England

[22] Filed: Oct. 29, 1974

[21] Appl. No.: 518,736

[30] Foreign Application Priority Data
Nov. 10, 1973 United Kingdom............ 52281/73

[52] U.S. Cl.................................. 428/315; 428/117; 428/158; 428/195; 428/310
[51] Int. Cl.².................... B32B 3/26; B32B 5/18
[58] Field of Search.......... 428/117, 158, 195, 310, 428/315; 427/272, 282, 265, 264

[56] References Cited
UNITED STATES PATENTS

| | | | |
|---|---|---|---|
| 2,651,871 | 9/1953 | Lynden | 427/282 |
| 2,744,042 | 5/1956 | Pace | 428/117 |
| 2,837,455 | 6/1958 | Wolf | 428/310 |
| 2,920,977 | 1/1960 | Adams | 428/310 |
| 3,293,094 | 12/1966 | Nairn et al. | 156/79 |
| 3,458,337 | 7/1969 | Rugg | 428/310 |
| 3,464,934 | 9/1969 | Birkett | 428/195 |
| 3,574,659 | 4/1971 | Kwart et al. | 428/310 |
| 3,640,798 | 2/1972 | Deeds | 428/117 |
| 3,674,611 | 7/1972 | Petry et al. | 428/158 |
| 3,741,851 | 6/1973 | Erb et al. | 428/195 |

*Primary Examiner*—Michael F. Esposito
*Attorney, Agent, or Firm*—Young & Thompson

[57] ABSTRACT

An imperforate sheet of gasket material from which gaskets, for preventing leakage of fluid between opposed surfaces, can be made. The sheet, which may be produced by various methods, comprises a matrix of an elastically-compressible material and discrete volumes of substantially-rigid material so distributed therein that upon compressing the sheet between opposed surfaces, initially the matrix material solely resists compression and only thereafter do the discrete volumes also resist compression. The distribution is also such that the mean rate of compression over any area of the sheet is substantially the same as the mean rate of compression over another area of the sheet when the areas are similarly compressed. The discrete volumes form compression stops to resist undesirable over-compression of the sheet. Such a sheet has application in the automotive industry, gaskets made therefrom being particularly suitable for fluid-sealing in vehicle engines.

1 Claim, 13 Drawing Figures

GASKET MATERIAL

This invention relates to gasket material.

In order to prevent leakage of fluid between opposed surfaces of two parts which are connected together by securing means, for example bolts, it is necessary to place a gasket made from gasket material between the two surfaces and to compress the gasket by tightening the securing means.

In practice however such gaskets made from certain materials hitherto available have not been suitable for use over a wide range of tightening pressures and operating temperatures because, due to the tendency of those materials to creep with consequent permanent reduction in thickness, they have been unable to fulfill the required sealing function over that range.

Thus, it has been desirable for the material to be of a form embodying compression stop means in order to resist over-compression thereof when being compressed between two surfaces.

In some cases the stop means has either taken the form of a metal framework or alternatively inserts tightly fitting in respective apertures formed in the material.

It is an object of this invention to provide an improved gasket material.

According to the invention an imperforate sheet of gasket material, from which gaskets can be made, comprises a matrix of an elastically-compressible material having discrete volumes of a substantially-rigid material so distributed therein that (i) upon compressing the sheet between opposed surfaces, initially the matrix material solely resists compression and only thereafter do the discrete volumes also resist compression, and (ii) the mean rate of compression over any area of the sheet is substantially the same as the mean rate of compression over another area of the sheet when the areas are similarly compressed.

The said sheet may further include a permanent base to which said materials are bonded and which is of substantially-uniform thickness extending for the whole area of the sheet.

The said distribution of said volumes may be such that along planes which are parallel to the surfaces of the sheet and which intersect said volumes it is impossible to draw a straight line without passing through one at least of said volumes.

The said distribution may comprise discrete volumes whose sizes and cross-sectional shapes are substantially the same.

Also according to the invention there is provided a method of producing an imperforate sheet of gasket material of the kind set forth in the seventh paragraph herein, said method comprising:

a. depositing, upon predetermined areas of a base, discrete volumes of uniform height of a material in such a condition that it can flow onto the base during deposition but, once deposited, does not flow from the predetermined areas, said discrete volume material being, after hardening, substantially-rigid;

b. depositing, upon the uncovered areas of the base, matrix material in such a condition that it can flow onto the base up to the height of said discrete volumes, said matrix material being, after hardening, elastically-compressible, and containing a volume-increasing additive which is active during hardening; and c. hardening the sheet so formed and thereby, by reason of the volume-increasing additive, increasing the height of the matrix material.

Also according to the invention there is provided a method of producing an imperforate sheet of gasket material of the kind set forth in the seventh paragraph herein, said method comprising:

a. depositing, upon predetermined areas of a base, discrete volumes of uniform height of a material in such a condition that it can flow onto the base during deposition but, once deposited, does not flow from the predetermined areas, said discrete volume material being, after hardening, substantially-rigid, and containing a volume-reducing additivie which is active during hardening;

b. depositing, upon the uncovered areas of the base, matrix material in such a condition that it can flow onto the base up to the height of said discrete volumes, said matrix material being, after hardening, elastically-compressible; and c. hardening the sheet so formed and thereby, by reason of the volume-reducing additive, reducing the height of the discrete volumes.

Also according to the invention there is provided a method of producing an imperforate sheet of gasket material of the kind set forth in the seventh paragraph herein, said method comprising:

a. depositing, upon predetermined areas of a base, matrix material to a uniform height in such a condition that it can flow onto the base during deposition but, once deposited, does not flow from the predetermined areas, said matrix material being, after hardening, elastically-compressible, and containing a volume-increasing additive which is active during hardening;

b. depositing, upon the uncovered areas of the base, discrete volumes of a material in such a condition that it can flow onto the base up to the height of the matrix, said discrete volume material being, after hardening, substantially-rigid; and c. hardening the sheet so formed and thereby, by reason of the volume-increasing additive, increasing the height of the matrix material.

Also according to the invention there is provided a method of producing an imperforate sheet of gasket material of the kind set forth in the seventh paragraph herein, said method comprising:

a. depositing, upon predetermined areas of a base, matrix material to a uniform height in such a condition that it can flow onto the base during deposition but, once deposited, does not flow from the predetermined areas, said matrix material being, after hardening, elastically-compressible;

b. depositing, upon the uncovered areas of the base, discrete volumes of a material in such a condition that it can flow onto the base up to the height of the matrix, said discrete volume material being, after hardening, substantially rigid, and containing a volume-reducing additive which is active during hardening; and c. hardening the sheet so formed and thereby, by reason of the volume-reducing additive, reducing the height of the discrete volumes.

Also according to the invention there is provided a method of producing an imperforate sheet of gasket material of the kind set forth in the seventh paragraph herein, said method comprising:

a. depositing, upon predetermined areas of a base, matrix material to a uniform height in such a condition that it can flow onto the base during deposition but, once deposited, does not flow from the predetermined areas, said matrix material containing a volume-increasing additive;

b. at least partially-hardening said matrix material, during which hardening said additive is active to increase the volume of that material, the material after hardening being elastically-compressible;

c. depositing, upon the uncovered areas of the base, discrete volumes of a material in such a condition that it can flow onto the base up to the height of the matrix, said discrete volume material containing a volume-reducing additive; and d. hardening the sheet so formed and thereby, by reason of said volume-reducing additive which is active during that hardening, reducing the height of the discrete volumes, said volumes then being substantially-rigid.

Following deposition of said discrete volumes and before deposition of said matrix, or alternatively, following deposition of said matrix and before deposition of said discrete volumes, said discrete volumes or said matrix, as the case may be, may be at least partially-hardened.

Following said hardening of said sheet so formed the hardened sheet may be removed from the base which may be of such nature as to allow the hardened sheet readily to be removed therefrom.

Before depositing said material upon said base, a release agent may be applied to the base and following said hardening of said sheet so formed the sheet may be removed from the base, such removal being facilitated by said release agent.

The said depositing of said discrete volumes or the said depositing of said matrix may be effected by a printing process.

The said printing process may utilise apparatus including a stencil and in this case the process may further utilise a foraminous screen associated with said stencil.

Alternatively, the said printing process may utilise apparatus including a roller device.

The said hardening may be effected by subjecting the respective material to a predetermined elevated temperature for a predetermined period of time.

The said volume-increasing additive may comprise a foaming agent which causes said matrix material, when hardened, to become cellular in character.

By "elastically-compressible material" used above is meant a material which has good sealing characteristics whereby the material has conformability with surfaces to be associated with the gasket material, and by "substantially-rigid material" is meant a material which, compared with said elastically-compressible material, has inferior sealing characteristics but has a high modulus of elasticity whereby its resistance to creep over a wide range of environmental conditions is high.

Eight embodiments of the invention will now be particularly described by way of example with reference to the accompanying drawings of which.

Figure 1:
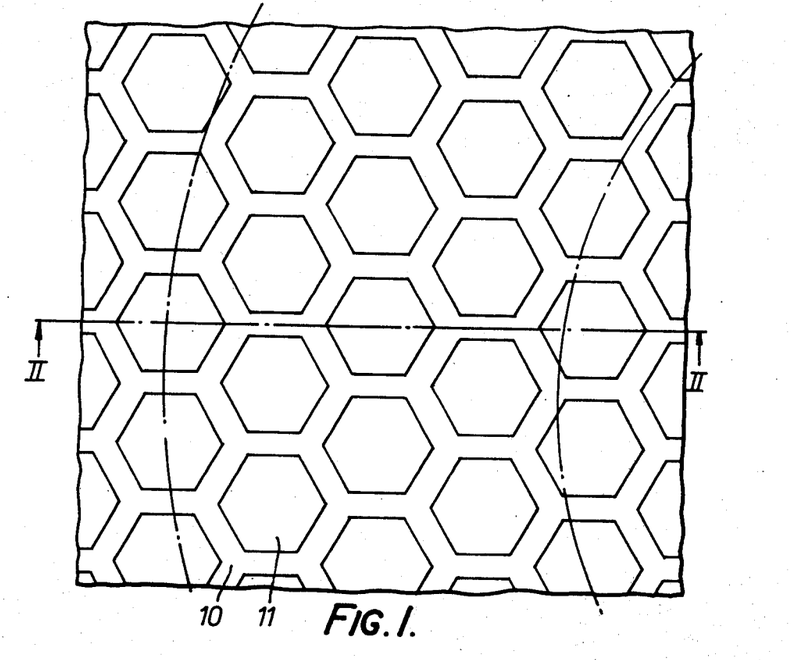
FIG. 1 is an enlarged view of a surface of a part of a sheet of a first gasket material.
Figure 2:
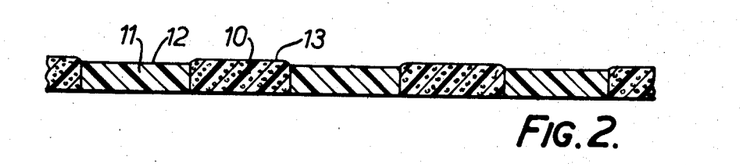
FIG. 2 is a section taken along the line II — II on FIG. 1.
Figure 3:
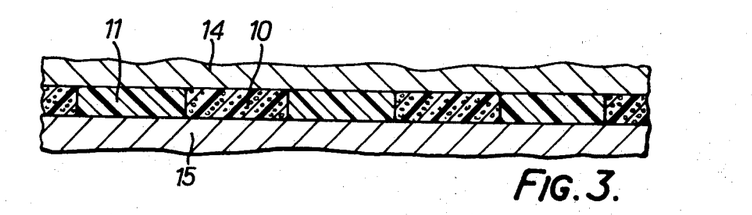
FIG. 3 is a section similar to that of FIG. 2 but showing the gasket material compressed between two opposed surfaces.

With reference to FIGS. 1 and 2 of the drawings, a sheet of gasket material comprises a matrix 10 of elastically-compressible material having a distribution, included therein and bonded thereto, of discrete solid volumes 11 of a material which is substantially-rigid and thus harder than the elastically-compressible material. In this way the substantially-rigid material has substantially greater compression-resistance than the elastically-compressible material. The volumes 11 are each of hexagonal cross-sectional shape and as shown in FIG. 2 their heights are less than the overall thickness of the gasket material so that their upper ends 12 are somewhat sunken with respect to the upper surface 13 of the matrix 10. The material of the matrix is an epoxy resin containing a foaming agent, in this embodiment benzene sulphone hydrazide, whereby hardening of the material renders the structure thereof cellular, while the material of the volumes 11 is a hardened polyester resin loaded with a reinforcing filler comprising solid glass particles. A gasket made from this gasket material, as in part indicated by the broken lines of FIG. 1, is suitable for fitment between two parts, such as those shown at 14 and 15 in FIG. 3, in order to prevent leakage of fluid between the opposed surfaces of those parts. When securing means (not shown) which connect the two parts are tightened, the gasket is compressed between the opposed surfaces. The volumes 11 are so distributed in the matrix 10 that initially, upon such compression, the elastically-compressible material of the matrix solely resists compression, and only thereafter, as indicated in FIG. 3, do the volumes 11 also resist compression, the matrix and the volumes then resisting compression in parallel. The nature of the substantially-rigid material of the volumes 11 is such that these volumes form compression stops in the gasket material to resist over-compression of the gasket material when the securing means are being tightened which might otherwise so condition the material that it is unsuitable for its intended use. Further, the volumes 11 are so distributed in the matrix 10 that the mean rate of compression over any area of the gasket material is substantially the same as the mean rate of compression over another area of the gasket material when the areas are similarly compressed.

The gasket material is thus suitable for use over a wide range of tightening pressures and operating temperatures.

The distribution of the discrete volumes 11 is such that along planes which are parallel to the surfaces of the gasket material and which intersect the discrete volumes it is impossible to draw a straight line without passing through one at least of the discrete volumes. In this way the distribution of the discrete volumes affords the gasket material a degree of firmness or stiffness which is advantageous when the material is in its free unsupported state, for handling, storing and cutting thereof.

Figure 4:
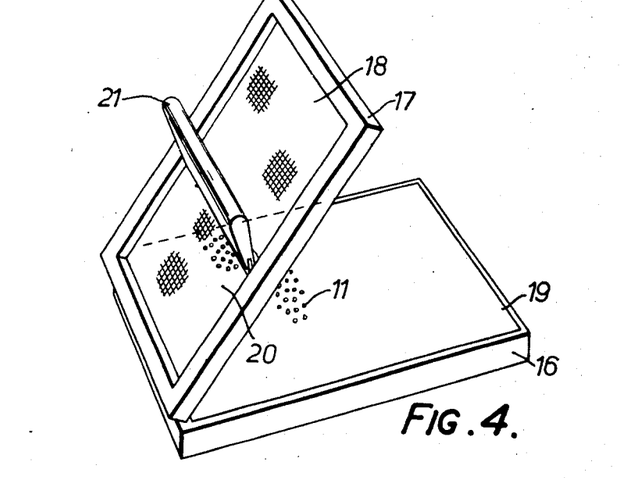
FIG. 4 is a diagrammatic perspective view of an apparatus suitable for producing the gasket material shown in FIGS. 1 to 3.
Figure 5:
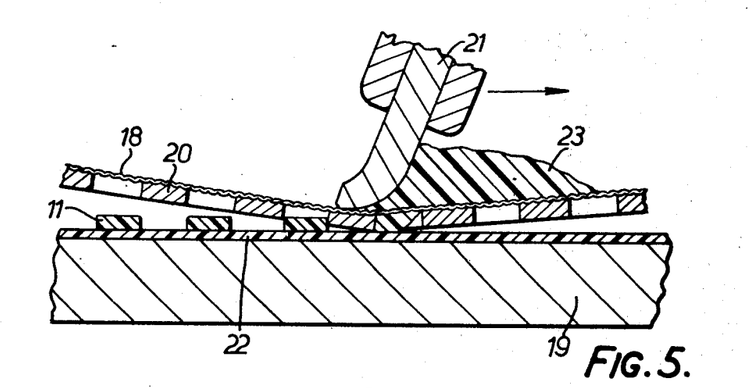
FIG. 5 is a section of a part of the apparatus shown in FIG. 4 illustrating one process step.
Figure 6:
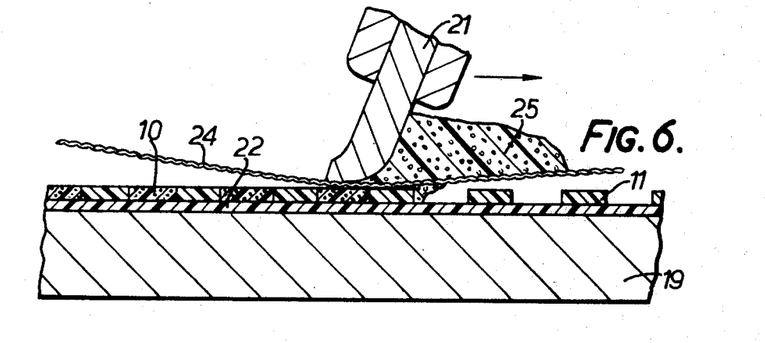
FIG. 6 is a section similar to that of FIG. 5 but showing another process step.

The gasket material shown in FIGS. 1 to 3 is produced by use of the apparatus shown in FIGS. 4, 5 and 6. The apparatus is of the screen-printing type and comprises a bed 16 having a frame 17 hingedly mounted on one edge thereof. The frame carries a tightly-stretched foraminous screen 18 formed of woven nylon filaments. The bed includes a metal base 19, and a stencil 20 is secured to the underside of the screen. The stencil has a distribution of apertures of hexagonal cross-sectional shape corresponding to the required distribution of volumes 11 in the gasket material. A squeegee-like implement 21 is provided in association with the frame 17 and when the frame is closed down, the stencil 20 is positioned a predetermined distance above the base 19.

In using the apparatus for producing a sheet of gasket material a release agent in the form of a coating 22 of polytetrafluoroethylene is first applied to the upper surface of the base 19. The stencil 20 and the screen 18 are then positioned said predetermined distance above the base and a quantity 23 of the material intended for the volumes 11, which material in this embodiment is the polyester resin, is placed upon the screen 18. The screen 18 and stencil 20 are pressed down as shown in FIG. 5 by the implement 21 and the latter is used to spread the polyester resin over the screen. The action of the implement is to force the polyester resin through the screen and also through the hexagonal apertures of the stencil on to the coating 22 on the base 19 to a predetermined height. The screen and stencil are then raised leaving the volumes 11 of hexagonal cross-section deposited on the coating 22 in the required distribution.

Such deposition is satisfactorily achieved because the polyester resin has such thixotropic characteristics that when in its condition for deposition it is capable of a limited amount of flow under the action of surface tension and gravity, but since it is then of a pasty nature, once deposited it does not substantially deform from its form as deposited, so that areas of the coating are left free of this material.

In order to harden the volumes 11 of polyester resin the base 19 is placed in a hot air blast oven (not shown) and together with the volumes 11 deposited thereon is subjected to a predetermined elevated temperature for a predetermined period of time.

The base 19 carrying the hardened and now substantially-rigid volumes 11 is then returned to the bed 16 and as shown in FIG. 6 another screen 24 similar to the screen 18 but with no associated stencil is positioned a predetermined distance above the base. A quantity 25 of the material intended to form the matrix 10, which in this embodiment is the epoxy resin containing a foaming agent, is placed on the screen 24. The screen is then pressed down as shown in FIG. 6 by the implement 21 and the latter is then used to spread the epoxy resin over the screen. The epoxy resin is in consequence forced through the screen and is deposited upon the coating 22 on the base to the height of the volumes 11 as shown, thereby covering the said areas of the coating left free by the volumes 11.

Thereafter the base is again placed in the hot air blast oven and the epoxy resin is hardened by subjection to a predetermined elevated temperature for a predetermined period of time. During hardening, due to the presence of the foaming agent, the material of the matrix becomes cellular in character, and stands proud of the upper ends 12 of the volumes 11 as shown in FIG. 2. Also the matrix 10 and volumes 11 become bonded together.

Following hardening, removal of the sheet of gasket material so produced from the base 19 is facilitated by the coating 22 of release agent.

Figure 7:
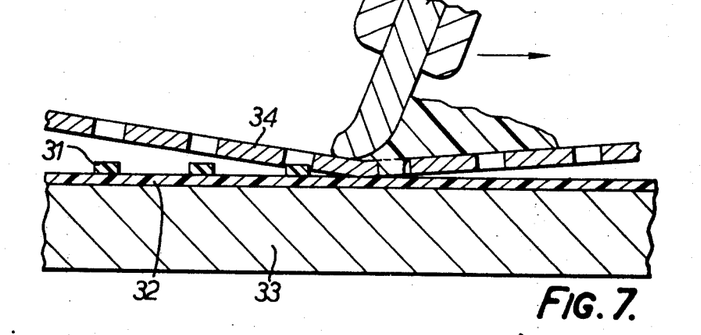
FIG. 7 is a section of apparatus used in a second embodiment, that apparatus being similar to the apparatus of FIG. 5 but omitting the screen thereof.

With reference now to FIG. 7, the discrete solid volumes 31 deposited upon the polytetrafluoroethylene coating 32 on the base 33 are so small in cross-sectional area and/or the precise nature of the polyester resin material of those volumes is such as to render the provision of a foraminous screen in association with the stencil 34 unnecessary. Otherwise the process of this second embodiment is the same as for the above-described first embodiment except that the squeegee-like implement 35 directly bears upon the stencil 34.

Figure 8:
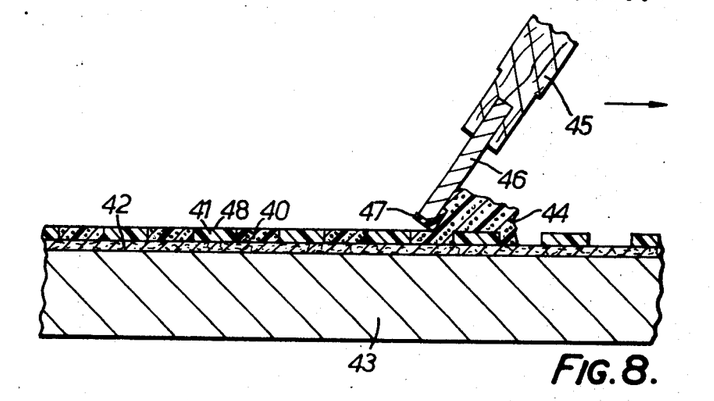
FIG. 8 is a section of apparatus used in a third embodiment, that apparatus being similar to FIG. 6 but omitting the screen thereof.

In a third embodiment the method of, and apparatus for, depositing and hardening the discrete solid volumes is as described with reference to FIGS. 4 and 5, but the material intended to form the matrix 40 is applied in the manner shown in FIG. 8. In that Figure the discrete solid volumes 41 are shown already deposited, in this case upon a silicone release paper 42 which is itself positioned on a base 43. No foraminous screen is used in the depositing of the epoxy resin material of the matrix. Instead this material 44 which contains a foaming agent is directly spread into the spaces between the volumes 41 by the use of a doctor knife 45 in the manner shown. The doctor knife includes a steel blade 46 having a rubber working strip 47. Following the spreading operation the material 44 of the matrix is hardened and becomes cellular in character, standing proud of the upper ends 48 of the volumes 41 as required. Again the matrix 40 and the volumes 41 become bonded together. After hardening, removal of the gasket material, so produced, from the base 43 is facilitated by the silicone release paper 42.

Figure 9:
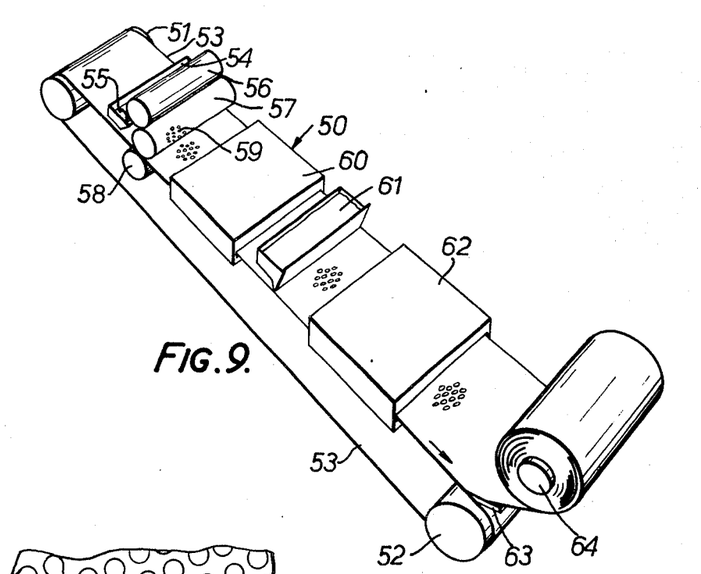
FIG. 9 is a diagrammatic view of an apparatus, alternative to that of FIG. 4, and used in a fourth embodiment for producing the gasket material shown in FIGS. 1 to 3, FIGS. 10, 11 and 12 are views similar to that of FIG. 1 but on a smaller scale and showing alternative patterns on sheets of gasket material in accordance with fifth, sixth and seventh embodiments, and, FIG. 13 is a section of gasket material, on a base, as produced in accordance with an eighth embodiment.

As an alternative to the use of the apparatus shown in FIGS. 4 to 6, 7 or 8, the gasket material in FIGS. 1 to 3 may be produced in a continuous manner by means of a process using the apparatus diagrammatically shown in FIG. 9.

The apparatus 50 comprises a pair of rollers 51, 52, having an endless belt 52 mounted upon them which is movable in the direction of the arrow.

A trough 54 is mounted just above the belt in the position shown and a dressing roller 55 mounted in the trough is in engagement with a driving roller 56 which is itself driven by suitable means (not shown). The roller 56 engages a roller 57 which is engageable with the belt 53. When engaging the belt the roller 57 is caused to press the belt against another roller 58. The roller 57 bears a pattern 59 of recesses corresponding to the distribution of discrete solid volumes of material as required to be applied in the gasket material, that is, having recesses of hexagonal cross-sectional shape corresponding to the pattern shown in the gasket material of FIG. 1.

A hot air blast oven 60 is provided a short distance from the rollers, the belt 53 passing through this oven. On that side of the oven remote from the rollers a further trough 61 is provided above the belt as shown. The base of this trough is provided with a slit (not shown) arranged transversely with respect to the belt and through which material can pass from the trough onto the belt.

A further hot air blast oven 62 is provided on that side of the trough 61 remote from the oven 60, the belt 53 passing through the oven 62 as shown. A splitter device 63 is positioned adjacent the roller 52 and a take-up roller 64, arranged to be driven by suitable take-up drive means (not shown), is disposed just above the splitter device 63.

In operation of the apparatus 50 the trough 54 is filled with polyester resin, loaded with a reinforcing filler, intended for forming the discrete solid volumes of substantially-rigid material. Upon driving of the roller 56, the dressing roller 55 is driven and applies the polyester resin from the trough 54 to the roller 56 and thence to the recesses in the roller 57. The roller 57 is now held in engagement with the belt 53 which, in turn, is pressed against the roller 58, the belt being thereby driven on its rollers 51, 52. As the belt 53 moves along in the direction of the arrow the polyester resin in the recesses 59 is deposited by the rotating roller 57 continuously upon the belt.

The nature of the polyester resin when in its condition for deposition is such that the discrete solid volumes of hexagonal cross-section, being pasty, adhere to the belt rather than remain in the recesses 59 in the manner of a continuous printing process. Also, once deposited, the pasty volumes do not substantially deform from their form as deposited so that areas of the belt are left free of this material. Following deposition of their discrete solid volumes the recesses of the roller 57, upon continued rotation of the roller, are replenished by the roller 56.

The belt 53, with the discrete solid volumes adhering thereto in the required distribution, then passes through the oven 60 where the volumes are hardened by subjecting them to a predetermined elevated temperature for a predetermined period of time. These volumes now become substantially-rigid in character. As the belt leaves the oven 60 and passes beneath the slit in the base of the trough 61, epoxy resin which includes a foaming agent and which is present in the trough 61, flows onto the belt, its rate of flow being carefully controlled by suitable means (not shown). The epoxy resin is deposited onto the belt to the height of the discrete solid volumes, thereby covering the areas of the belt left free by the discrete volumes. As the belt then passes on through the oven 62 the epoxy resin is hardened by subjecting it to a predetermined elevated temperature for a predetermined period of time and due to the presence of the foaming agent this material becomes cellular in character to form the matrix of the gasket material, standing proud of the upper ends of the discrete solid volumes of the substantially-rigid material as required. Further the discrete solid volumes and the matrix which is now of elastically-compressible character become bonded together.

With continued movement of the belt 53 the splitter device 63 acts to part the gasket material, comprising the epoxy resin with said discrete solid volumes contained therein, from the belt itself. The take-up spool 64 receives the gasket material so formed. Thus the material can subsequently be stored in rolls.

It will be understood that to facilitate separation of the gasket material from the belt, a suitable release agent may be applied on the surface of the belt prior to deposition of the discrete solid volumes to assist the splitter device in the separating function.

Figure 10:
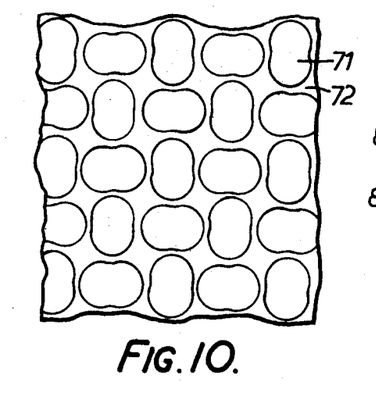
Figure 11:
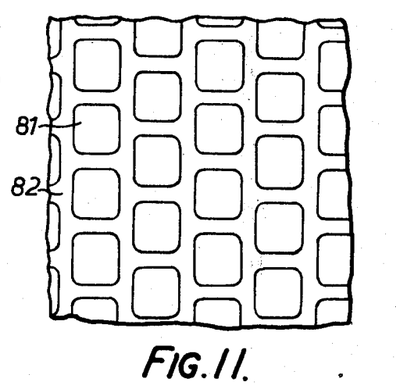
Figure 12:
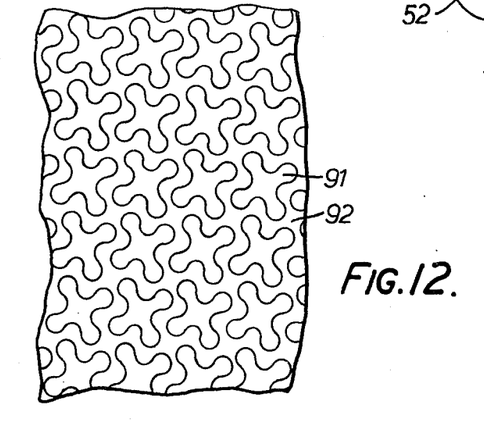

FIGS. 10, 11 and 12 show three further embodiments of the invention wherein the gasket materials, instead of having a distribution of discrete solid volumes of hexagonal cross-sectional shape, as in FIGS. 1 to 3, have a distribution of discrete solid volumes of other cross-sectional shapes which may be more desirable in certain applications of those gasket materials.

In FIG. 10 the volumes 71 included in the matrix 72 are each of the form shown in cross-section with radiussed end portions. In FIG. 11 the volumes 81 included in the matrix 82 are each of square form in cross-section with radiussed corners. In FIG. 12 the volumes 91 included in the matrix 92 are each of cross-like form in cross-section with radiussed end portions.

As with the gasket material of FIG. 1 the distribution of the discrete solid volumes in both FIG. 10 and FIG. 12 is such that, along planes which are parallel to the surfaces of the gasket material and which intersect the discrete solid volumes, it is impossible to draw a straight line without passing through certain of the discrete solid volumes, this again affording the gasket material a degree of firmness or stiffness which is advantageous, when the material is in its free unsupported state, for handling, storing and cutting thereof. In FIG. 12 particularly the arrangement permits closer grouping of the volumes 91 one with respect to another and thereby affords the material even better firmness for handling, storing and cutting.

Figure 13:
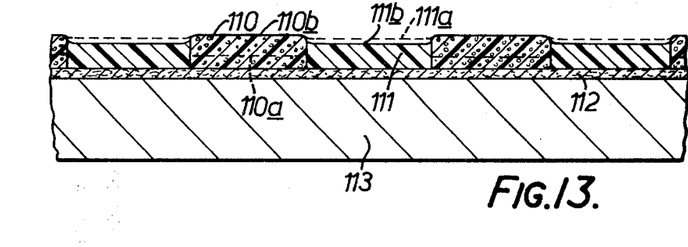

With reference now to FIG. 13 there is shown a part of a sheet of gasket material comprising a matrix 110 of elastically-compressible material including discrete solid volumes 111 of a substantially-rigid material as laid up on a release agent in the form of silicone paper 112 disposed on a base 113.

The method used in producing this sheet differs from those of the previous embodiments in that the matrix is deposited on the release agent first. Such deposition which is to a predetermined height as indicated by the dotted lines 110a, is effected by the use of a stencil, foraminous screen and squeegee-like implement (not shown). The material of the matrix which is an epoxy resin is deposited in a flowable but pasty condition, the material being then such that once deposited it does not flow with respect to the release agent and therefore leaves areas of the release agent uncovered by that material. The matrix so deposited is thereafter hardened by subjecting it to a predetermined elevated temperature for a predetermined period of time and since, as with the previous embodiments, the material thereof includes a foaming agent, the depth of the material then increases to the full lines 110b. Thereafter the material for the discrete solid volumes 111, which again is a polyester resin loaded with a filler, is deposited in a flowable condition by means of a squeegee-like implement directly into the spaces formed in the matrix, the deposition being to a predetermined height as indicated by the dotted lines 111a. This discrete volume material also contains a solvent, in this embodiment 2 - ethoxyethyl acetate, and when the material in subsequently hardened by subjecting it to a predetermined elevated temperature for a predetermined period of time the solvent produces shrinkage of the material so that the height thereof is reduced to the full lines 111b. At the same time the matrix and the discrete volumes become bonded together.

Finally, by virtue of the release agent the sheet of gasket material so produced is removed from the base 113.

Although in the above-described embodiments the substantially-rigid material of the discrete solid volumes is a polyester resin loaded with a reinforcing filler, in other embodiments it may be of any other suitable material, for example, a suitable epoxy resin similarly loaded. Instead of the elastically-compressible material of said matrix taking the form of epoxy resin with a suitable foaming agent, it may be of any other suitable material, for example nitrile rubber, polyvinylchloride, silicone resin or silicone rubber, with or without a foaming agent additive.

By the term "elastically-compressible material" hereinbefore used is meant a material having good sealing properties whereby surface imperfections in the parts to be associated with the gaset material can readily be accommodated, and by the term "substantially-rigid material" is meant a material which, compared with the elastically-compressible material, has inferior sealing properties but a high modulus of elasticity whereby it has a high resistance to creep when used over a wide range of environmental conditions.

The invention is not limited to the cross-sectional shapes of the said discrete solid volumes in the distributions shown in FIGS. 1, 10, 11 and 12, as in other embodiments of the invention yet other suitable shapes may be used.

In alternative embodiments of the invention one of the said discrete solid volumes of the substantially-rigid material may be connected to another of those volumes by means of a relatively small volume of that material, the said relatively small volume passing through the elastically-compressible material of the matrix and being bonded thereto, but having substantially no interfering effect upon the parallel resistance to compression of said elastically-compressible material and said substantially-rigid material.

Instead of using polytetrafluoroethylene or a silicone paper as a release agent any other suitable release agent may be used, for example polytetrafluoroethylene loaded with glass fibers.

Although in the embodiments described with reference to the drawings one end of each discrete solid volume is substantially flush with one surface of the matrix and the other end thereof is sunken with respect to the opposite surface of the matrix, in alternative embodiment both ends of each said volume may be sunken with respect to their respective surfaces of the matrix.

In certain cases the process of manufacture may be such that where an end or the ends of a volume are so sunken a skin of the material of the matrix may cover the said end or ends.

The density of distribution of discrete solid volumes in the gasket material, the heights of those volumes in relation to the overall thickness of the gasket material, and the shapes of those volumes are chosen to suit the particular intended applications of the material.

By so providing gasket material containing a distribution of discrete solid volumes of the substantially-rigid material contained in the matrix of elastically-compressible material, and by so arranging for this gasket material to be produced in sheet form, gaskets embodying a required distribution of compression-limiting means can readily be cut, punched or otherwise made from the material as desired to suit many applications, for example in the automotive industry applications to fluid-sealing in vehicle engines.

Although in the above-described embodiments the base upon which the gasket material is deposited is only a temporary one, in other embodiments the base may be permanent and thus form part of the finished gasket material, being thin, of uniform thickness and extending for the whole area of the material, enabling it, together with the substantially-rigid material and the elastically-compressible material bonded thereon, to be stored either in flat sheets or in rolls. When subsequently producing gaskets therefrom the required shapes are cut, punched, or otherwise made from said base and said two materials simultaneously.

Further, in alternative embodiments where the gasket material so includes a base, said substantially-rigid material and said elastically-compressible material may be deposited in suitable manner to form discrete volumes and a matrix not only on one surface of the base but on the opposite surface thereof as well.

Although in the embodiments above described with reference to the drawings the material first deposited upon the release agent or belt is subjected to a hardening process before deposition of the second material, in othe embodiments the first-deposited material is only allowed or caused partially to harden before deposition of the second material and becomes fully hardened upon hardening of the second material.

Again, although in the embodiments above described with reference to FIGS. 1 to 6 the elastically-compressible material is, following deposition, caused to expand in volume whereby the height of deposit of that material is greater than that of the substantially-rigid material already deposited, in alternative embodiments of the invention the substantially-rigid material is again the first of those two materials to be deposited but after such deposition is only partially-hardened. The elastically-compressible material does not in this case include a volume-increasing additive and thus is not, on hardening after deposition, caused to expand. Instead the substantially-rigid material has a volume-reducing additive whereby when the material is hardened the discrete volumes thereof become reduced in size so that the height of deposit of said volumes in the finished sheet is less than that of the matrix of elastically-compressible material.

Although in the embodiment above described with reference to FIG. 13 the elastically-compressible material is, following deposition, caused to increase in volume and thereafter the substantially-rigid material is, following deposition, caused to reduce in volume, whereby the height of deposit of the substantially-rigid material is less than that of the elastically-compressible material, in alternative embodiments of the invention the elastically-compressible material is likewise deposited before the substantially-rigid material but immediately following deposition the elastically-compressible material is only partially-hardened. The substantially-rigid material in this case is not, following deposition, caused to reduce in volume but instead only the elastically-compressible material has an additive so that on fully hardening the matrix of that material it increases in volume whereby the height of deposit of the elastically-compressible material in the finished sheet is greater than that of the substantially-rigid material.

Alternatively again, where the elastically-compressible material is deposited before the substantially-rigid material, the elastically-compressible material is not, following deposition, caused to expand in volume, but instead only the substantially-rigid material has an additive so that on fully hardening the discrete volumes of that material they reduce in volume whereby the height of deposit of the discrete volumes in the finished sheet is less than that of the elastically-compressible material.

Although in the embodiments above-described the elastically-compressible material and the substantially-rigid material become bonded together upon hardening, in alternative embodiments of he invention the two materials are deposited upon a base and become permanently bonded thereto so that the base is part of the finished sheet of gasket material, but the two materials so deposited are not themselves bonded together.

Also, although in the embodiments above described the said discrete volumes of substantially-rigid material are solid, in alternative embodiments the discrete volumes, although exhibiting their sustantially-rigid characteristics, may be hollow but have such thick walls as will provide the required resistance to compression in the sheet of gasket material.

Since the processes of manufacture of the gasket material hereinbefore described involve relatively straightforward deposition techniques, the material can be produced relatively inexpensively.

We claim:

1. An imperforate sheet of gasket material from which gaskets can be made, said sheet comprising a matrix of a material which is elastically-compressible whereby it has substantial sealing ability, and a plurality of discrete volumes, contained in said matrix, which are of a material having a high modulus of elasticity, being thereby substantially-rigid, said discrete volumes being so distributed in said matrix that (i) upon compressing he sheet between opposed surfaces to be sealed, initially the matrix material solely resists compression and only thereafter do the discrete volumes also resist compression, and (ii) the mean rate of compression over any area of the sheet is substantially the same as the mean rate of compression over another area of the sheet when the areas are similarly compressed, said distribution of said volumes being such that along planes which are parallel to the surfaces of the sheet and which intersect said volumes it is impossible to draw a straight line without passing through one at least of said volumes.

* * * * *